(12) United States Patent  
Kamiya et al.

(10) Patent No.: US 7,868,987 B2  
(45) Date of Patent: Jan. 11, 2011

(54) LIQUID CRYSTAL PANEL FOR LIQUID CRYSTAL DISPLAY DEVICE

(75) Inventors: Hiroyuki Kamiya, Yokohama (JP); Hsin-An Cheng, Hsinchu (TW)

(73) Assignee: InfoVision Optoelectronics Holdings Limited, Tortola (VG)

( * ) Notice: Subject to any disclaimer, the term of this patent is extended or adjusted under 35 U.S.C. 154(b) by 539 days.

(21) Appl. No.: 11/998,104

(22) Filed: Nov. 28, 2007  
(Under 37 CFR 1.47)

(65) Prior Publication Data  
US 2008/0284963 A1 Nov. 20, 2008

(30) Foreign Application Priority Data  
Dec. 2, 2006 (JP) .............................. 2006-326390

(51) Int. Cl.  
G02F 1/1345 (2006.01)  
G02F 1/1339 (2006.01)

(52) U.S. Cl. .................................. 349/149; 349/153  
(58) Field of Classification Search ......... 349/149–154, 349/189–190  
See application file for complete search history.

(56) References Cited

U.S. PATENT DOCUMENTS 6,259,505 B1 * 7/2001 Makino ...................... 349/153  
7,602,453 B2 * 10/2009 Kawano et al. ............... 349/39

FOREIGN PATENT DOCUMENTS

JP 11-052394 2/1999

* cited by examiner

Primary Examiner—Dung T. Nguyen  
(74) Attorney, Agent, or Firm—Nields, Lemack & Frame, LLC

(57) ABSTRACT

To utilize effectively the panel space of the liquid crystal panel, this invention has provided a wiring structure, in which the seal material and BM are coated in a superposition and the UV light is irradiated from one side of the TFT substrate; this invention has also provided a wiring structure, in which the seal material can still be irradiated by the UV light with high efficiency, meanwhile, the drop of the resistance value of the metal wiring on the TFT substrate can be restricted to a specific range. The solution is: the liquid crystal dropped is sandwiched between the TFT substrate and the CF substrate, meanwhile the liquid crystal panel is formed by adhering the light cured seal material disposed at the peripheral area of two substrates. In the adhering-formed liquid crystal panel, for the wiring portion, which is the portion of wiring disposed on the TFT substrate superposing the light cured seal material, the wiring structure is formed as follows, that is, the region of the seal material is divided into three regions, an adjacent region, a middle region and an outer region. The function of the respective regions must be held, and the resistance of the metal wiring is minimized under the precondition that the respective function is satisfied sufficiently.

9 Claims, 5 Drawing Sheets

LIQUID CRYSTAL PANEL FOR LIQUID CRYSTAL DISPLAY DEVICE

FIELD OF THE INVENTION

The invention relates to a liquid crystal panel for an active matrix liquid crystal display device.

DESCRIPTION OF THE RELATED ART

In recent years, Thin Film Transistor-Liquid Crystal Display (TFT-LCD) panel has been used widely as the monitor of the desktop personal computer and the display device of the notebook computer. For the future, besides that TFT-LCD should satisfy the performances required for operating as a display device, from the viewpoint of decreasing the costs, it is important to improve the production efficiency by using larger mother glass substrate and to enhance the producing effects of the batch production by generalizing the components to reduce the manufacturing costs.

Therefore, as an indispensable manufacturing method for increasing the production efficiency, the number of LCD panels that can be arranged here is an important parameter relating directly to the throughput in a method referred to as "multiple-sheet-cutting" for cutting a plurality of LCD panels from one mother glass. If more panels can be configured, then the production efficiency will be increased, thereby the cost of the panel can be decreased.

The wiring for designing the TFT-LCD panel and the space for disposing the components locate on the mother glass.

In a process for assembling two glass substrates, thin film transistor (hereinafter referred to as TFT) substrate and color filter (hereinafter referred to as CF) substrate, a manufacturing method referred to as one drop fill (hereinafter referred to as ODF), that is, the liquid crystal and the seal material are dropped on the substrate in advance, then the glass substrates are adhered with each other, and then the seal material is cured, is adopted. An ultra violet light (UV) cured seal material, which can be cured rapidly, is used as the seal material when the two substrates of TFT substrate and CF substrate are assembled by employing ODF manufacturing method. Because said UV cured seal material can be cured instantly, the pollution caused when the uncured seal material contacts with the liquid crystal can be suppressed minimally by means of said UV cured seal material. After the seal material is cured by UV irradiation, heat treatment is performed to cure the epoxy resin of the UV cured seal material to further enhance the adhesive force.

For the prior liquid crystal panel, said seal material is disposed normally at the outer side of the black matrix (Hereinafter referred to as "BM") of CF, and the UV light is irradiated from one side of the CF substrate to cure the seal material. By this means of design, no object masks the irradiated UV light, so it is no problem.

However, in case the seal material is disposed at the outer side of BM, then sufficient large space is required at the peripheral area of the pixel region. As a result, the space is wasted. This will be described with reference to the figures as follows.

FIG. 1 is a partial plan view illustrating the configuration relationship of a black matrix of a CF substrate at the peripheral area of TFT-LCD panel with the seal material. In FIG. 1, 101 is a seal material, 102 is a BM, 103 is a cut-off line for cutting a mother glass, and 105~107 are the pigmentation portions of the CF substrate.

FIG. 2 is a cross sectional view along the cut-off line A-A in FIG. 1.

In FIG. 2, 201 is a CF substrate, 202 is a TFT substrate, and 203 is wiring, and 210 is an arrow indicating the direction of the UV light which is irradiated for curing the seal material 101.

As shown in FIG. 1 and FIG. 2, under a condition that the seal material 101 is disposed at the outer side of BM 102, if the UV light used for curing the seal material 101 is irradiated onto the CF substrate as shown by the arrow 210, then it is no problem because no any object masking the UV light exists. However, the space between BM 102 and the cut-off line 103 of the mother glass is required for disposing the seal material 101.

In order to decrease the space outside the pixel region as much as possible, a construction in which the seal material 101 and BM 102 are disposed in a superposing state and the UV light is irradiated from one side of the TFT substrate is taken into consideration.

FIG. 3 is a partial plan view illustrating a construction in which the seal material 101 and BM 102 are coated in a superposing state and the UV light is irradiated from one side of the TFT substrate. In FIG. 3, 101 is a seal material, 102 is BM, and 103 is the cut-off line.

FIG. 4 is a cross sectional view along the cut-off line B-B in FIG. 3. In FIG. 4, 203 is metal wiring which is disposed on the TFT substrate and superposed with the seal material 101, and 401 is an arrow indicating the irradiation direction of the UV light from one side of the TFT substrate 202. In such a structure, the space at the outer side of BM 102 is minimized.

However, the metal wiring 203 is predisposed on the TFT substrate. In such structure, the metal wiring 203 on the TFT substrate masks the UV light used for curing the seal material 101, and a portion which cannot be irradiated by the UV light is formed on the seal material 101, causing the so-called problem "shadow cure". Once the temperature at the places where the UV cure seal material under an uncured state contacting the liquid crystal rises during the following heat-cure process, the pollution substance is easy to be separated out from the seal material which has not been heat-cured to the liquid crystal, thereby the peripheral portion of the liquid crystal panel will be un-uniform. As disclosed in the Japanese Publication No. 11-52394, this problem can be solved by considering the method as shown in FIG. 6~FIG. 8.

FIG. 6 is a schematic view indicating a wiring structure in which the width of the wiring is narrowed at the superposing portion under a condition that the metal wiring traverses the seal material. If the width of the wiring is narrowed, then the UV light can only be irradiated to the seal material via the narrowed portion. In FIG. 6, 101 is a seal material, 601 is metal wiring, 602 is the portion of the metal wiring which intersects with the seal material and the width thereof is narrowed.

The disadvantage under the condition of FIG. 6 is that the resistance of the wiring at the narrowed portion becomes larger, and the current value is limited when the voltage is applied, and the voltage drop produced by the resistance will be larger so that the desired voltage value cannot be obtained.

FIG. 7 is a schematic view indicating a wiring structure in which the wiring of the superposition portion is formed by transparent electrode and the UV light is irradiated to the seal material via the transparent electrode portion under a condition that the metal wiring traverses the seal material.

In FIG. 7, 101 is a seal material, 601 is metal wiring, 702 is the portion of the metal wiring which intersects with the seal material and is formed by the transparent electrode, and 701 are contact holes for connecting the metal wiring and the transparent electrode.

The disadvantage under the condition of FIG. 7 is that the Ohm connection of low resistance is required to be formed at the connection section for the contact hole connecting the metal wiring and the transparent electrode, however, a amount of current flows through said connection section, so that it is difficult to form a highly reliable Ohm connection corresponding to said current. Furthermore, although the same Ohm couple is formed in the pixel region, but the amount of the current in the pixel region is rather small, therefore such problem will not occur there.

FIG. 8 is a schematic view indicating a wiring structure in which a slot is formed on the metal wiring of the superposition portion to allow the UV light to irradiate to the seal material via the slot under a condition that the metal wiring traverses the seal material.

In FIG. 8, 101 is a seal material, 601 is metal wiring, and 801 is a slot formed on the intersection portion where the metal wiring intersects the seal material.

The disadvantage under the condition of FIG. 8 is that the resistance of the wiring portion forming the slot becomes larger, the current is limited when the voltage is applied, or the voltage drop becomes larger because of the resistance, therefore the problem that the desired voltage value cannot be obtained comes up.

Furthermore, another countermeasure beyond those described above is a kind of design in which the metal wiring and the seal material are not superposed, however, under such condition, the metal wiring is disposed at the peripheral area so that the purpose of utilizing effectively the peripheral space cannot be reached.

The inventor has addressed that the function of the seal material is not uniform, and is different according to the respective different regions.

Firstly, if a region in the seal material which is close to the pixel region is in contact with the liquid crystal before it is cured sufficiently, the pollution is caused, therefore said region is a portion that has significant effects on the quality of the liquid crystal panel, and it is also a region which must be cured with the UV light sufficiently.

In contrast, because the outer region in the seal material which is located far from the pixel region is not in contact with the liquid crystal, so it has less influence on the reliability of the liquid crystal panel, however, since it is adjacent to the cut off-line of the glass substrate, if the seal material splashes to the outer side and traverses the cut-off line, then the glass substrate will not be cut off and rate of finished product will be decreased. More specifically, if the seal material has not been cured with the UV light sufficiently, the uncured portion at the gel state comes up, and at the beginning of the following heat-cure, the viscidity of the seal material decreases, and the seal material flows out along the metal wiring, or the seal material splashes due to the rapid temperature change. According to these conditions, it is only required that the UV light is irradiated to the outer region of the seal material to make the seal material be cured to a required state in order to suppress these phenomenon. More specifically, it can be done by an UV solidification about 1% to 10%, in other words, it can be done by that it is not at a gel state.

A middle region between the contiguous region and the outer region is not in contact with the liquid crystal, and the seal material is impossible to flow to the cut-off line at the outer side, therefore, it is only required that the adhesive force between the seal material and the substrate can be ensured. Normally, the seal material used in ODF method is a material which is cured by the UV light and the heat, and the epoxy resin is used for the heat-cure portion, at this time, the curing is only performed by heating rather than irradiating the UV light, even in such condition that the adhesive force is almost the same as that under the condition of irradiating the UV light. Therefore, even though the middle region is not irradiated by the UV light, it can still possess the indispensable function, therefore the wiring width of the metal wiring superposing with this portion can be increased in order to obtain low resistance.

SUMMARY OF THE INVENTION

Therefore, in order to utilize effectively the panel space of the liquid crystal panel, the object of the invention is to provide a liquid crystal panel having the following structure, that is, even though under a structure condition in which the seal material and BM are coated at a superposition state, and the UV light is irradiated from one side of the TFT substrate, the region corresponding to the seal material can also be irradiated effectively by the UV light thereby the increase of the resistance of the metal wiring superposing the seal material can be controlled in a specific range.

A liquid crystal panel at the first aspect of the invention has the following structure, comprising: a TFT substrate having the pixels containing the thin film transistors disposed thereon in a matrix form; a CF substrate having the color filters disposed thereon; and a liquid crystal sandwiched between said TFT substrate and said CF substrate, said TFT substrate and said CF substrate are adhered by the seal material therebetween, wherein:

the metal wiring disposed on said TFT substrate partially superposes said seal material, said seal material has a region, that is, hereinafter referred to as an adjacent region, which is adjacent to a region for disposing said pixels, that is, hereinafter referred to as a pixel region; a region at the utmost outer side, that is, hereinafter referred to as an outer region; and a region between them, that is, hereinafter referred to as a middle region, for the metal wiring in a portion where the metal wiring intersects the adjacent region of said seal material, the width of the wiring is decreased, for the metal wiring in a portion where the metal wiring intersects the middle region of said seal material, the width of the wiring is increased, for the metal wiring in a portion where the metal wiring intersects the outer region of said seal material, the width of the wiring is decreased.

Furthermore, a liquid crystal panel according to the second aspect of the invention is the liquid crystal panel according to the first aspect of the invention, wherein said metal wiring is disposed to intersect the adjacent region of said seal material, and said metal wiring is disposed to intersect the middle region of said seal material, and said metal wiring is disposed to intersect the outer region of said seal material.

Furthermore, a liquid crystal panel according to the third aspect of the invention is the liquid crystal panel according to the second aspect of the invention, the width of said metal wiring in the adjacent region is about 40 microns, the space between the adjacent metal wirings in the adjacent region is about 40 microns, the width of said metal wiring in the middle region is about 100 microns, the space between the adjacent metal wiring in the middle region is about 50 microns, the width of said metal wiring in the outer region is about 50 microns, the space between the adjacent metal wiring in the outer region is about 25 microns.

Furthermore, the liquid crystal panel according to the fourth aspect of the invention is the liquid crystal panel according to the first aspect of the invention, said metal wiring is disposed to superpose and be parallel with the adjacent region of said seal material, said metal wiring is disposed to superpose and be parallel with the middle region of said seal material, and said metal wiring is disposed to superpose and be parallel with the outer region of said seal material.

Further, the liquid crystal panel according to the fifth aspect of the invention is the liquid crystal panel according to the four aspect of the invention, the width of said metal wiring in the adjacent region is about 20 microns, the space between the adjacent metal wiring in the adjacent region is about 20 microns, the width of said metal wiring in the middle region is about 100 microns, the space between the adjacent metal wiring in the middle region is about 50 microns, the width of said metal wiring in the outer region is about 50 microns, the space between the adjacent metal wiring in the outer region is about 25 microns.

Further, the liquid crystal panel according to the sixth aspect of the invention is the liquid crystal panel according to the first aspect of the invention, said metal wiring is disposed to intersect the adjacent region of the seal material, said metal wiring is disposed to superpose the middle region of said seal material, and said superposing-disposed portion of the metal wiring is disposed to be the surface wiring with an opening, said metal wiring is disposed to intersect the outer region of said seal material.

Further, the liquid crystal panel according to the seventh aspect of the invention is the liquid crystal panel according to the first aspect of the invention, wherein the width of said adjacent region is 30~100 microns, and the width of said outer region is 30~100 microns.

Further, the liquid crystal panel according to the eighth aspect of the invention is the liquid crystal panel according to the first aspect of the invention, wherein said adjacent region is a region in said seal material beginning from the boundary of said pixel region and extending at a direction to said outer region for about 100 microns, and the wiring width of said metal wiring in the adjacent region is adjusted to allow the solidify, which is obtained by curing the seal material in the adjacent region by using the UV light curing, to reach above 60%.

Further, the liquid crystal panel according to the ninth aspect of the invention is the liquid crystal panel according to the first aspect of the invention, wherein said outer region is a region in said seal material beginning from the outer boundary and extending at a direction to said adjacent region for about 100 microns, in said outer region, the wiring width of said metal wiring in the outer region is adjusted to allow the solidify, which is obtained by curing the seal material in the outer region by using the UV light curing, to be about 10%, so that the expansion of the uncured seal material during the heat-curing will not exceed the cut-off line used for cutting the liquid crystal panel off from the mother glass.

When the invention is used, the problem caused by "the UV light is masked by the metal wiring on the TFT substrate thereby part of the seal material cannot be cured" occurring in a condition that the seal material and BM are superposed and the UV light is irradiated from one side of the TFT substrate can be solved by irradiating effectively according to the seal material region, that is, a desired amount of UV light is irradiated to the region where the irradiation is required, and the width of the metal wiring can be increased in the region where the irradiation is not very required, thereby the drop of the resistance value of the metal wiring can be restricted generally to a specific range. As a result, the seal material and BM can be superposed, and the peripheral area of the panel can be used effectively, and the requirement for decreasing the frame of the display device in recent years can be reached.

EXPLANATION OF SYMBOLS

Figure 1:
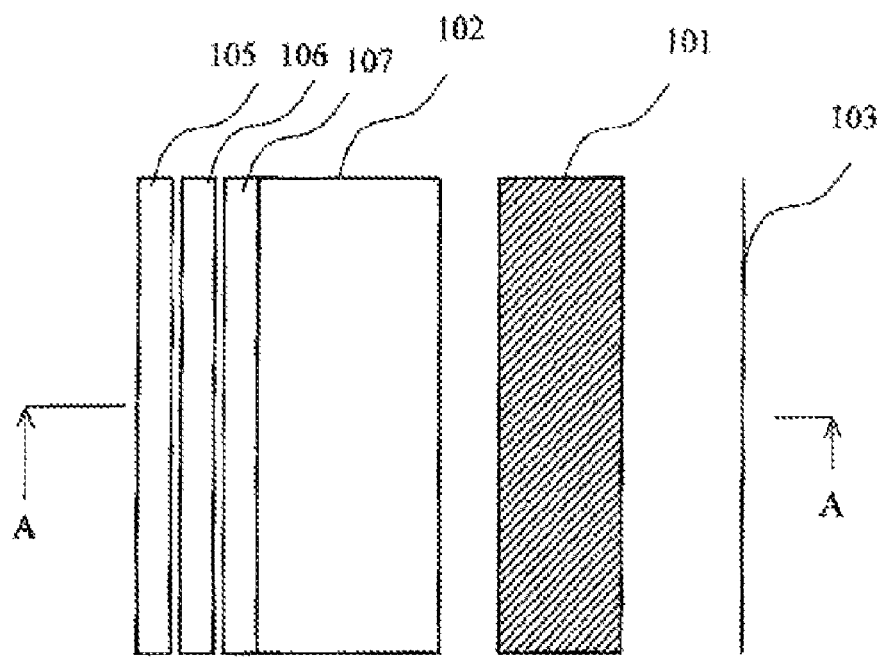
FIG. 1 is a partial plan view illustrating the configuration relationship of a black matrix of a CF substrate at the peripheral area of TFT-LCD panel and the seal material.
Figure 2:
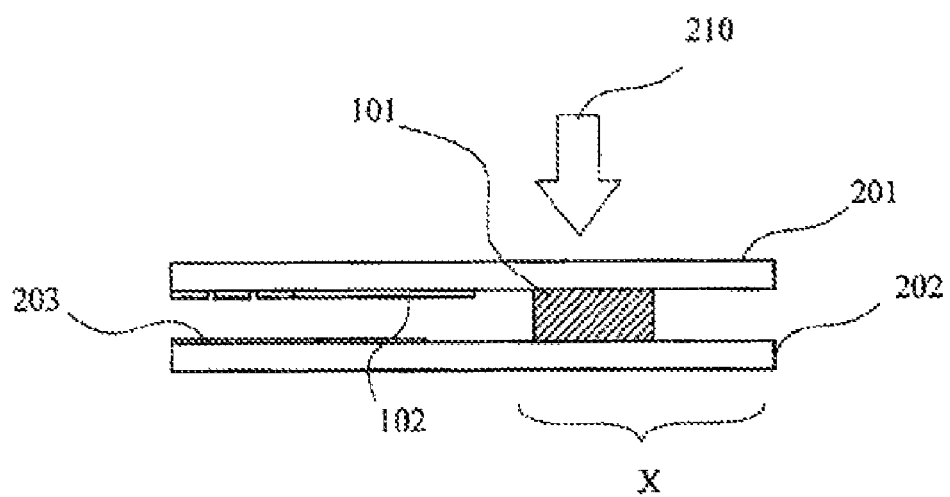
FIG. 2 is a cross sectional view along the cut-off line A-A in FIG. 1.
Figure 3:
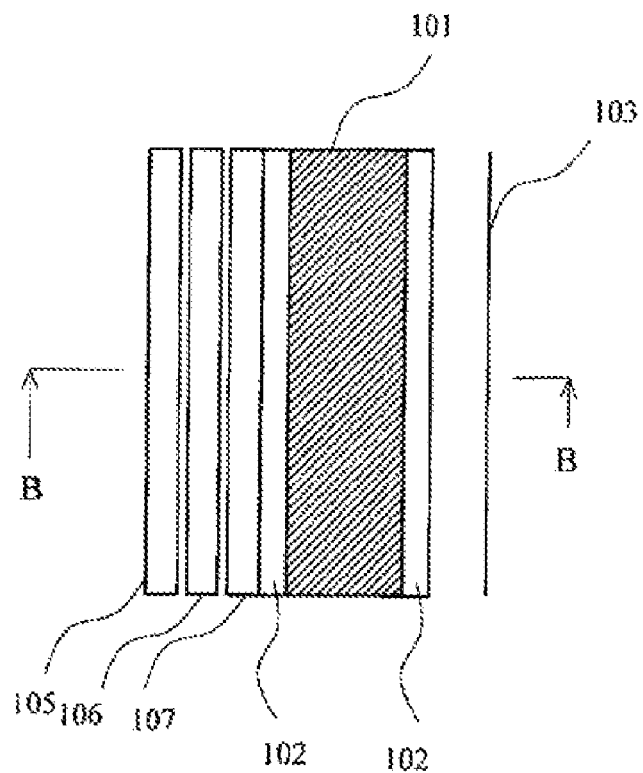
FIG. 3 is a partial plan view illustrating a construction in which the seal material 101 and BM 102 are coated in a superposition state and the UV light is irradiated from one side of the TFT substrate.
Figure 4:
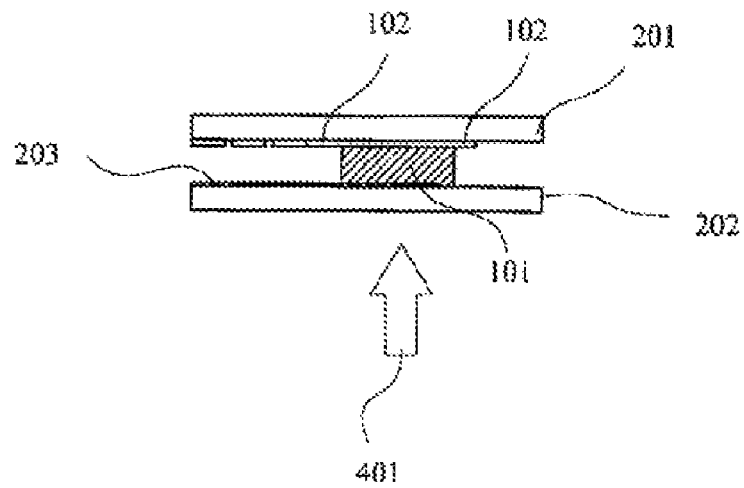
FIG. 4 is a cross sectional view along the cut-off line B-B in FIG. 3.

101: seal material
103: cut-off line
521: metal wiring in adjacent region
522: metal wiring in middle region
523: metal wiring in outer region
524: region of seal material in adjacent region which can be irradiated by UV light
525: region of seal material in middle region which can be irradiated by UV light
526: region of seal material in outer region which can be irradiated by UV light
531: metal wiring in adjacent region
532: metal wiring in middle region
533: metal wiring in outer region
534: region of seal material in adjacent region which can be irradiated by UV light
535: region of seal material in middle region which can be irradiated by UV light
536: region of seal material in outer region which can be irradiated by UV light
541: metal wiring in adjacent region
542: metal wiring in middle region
543: metal wiring in outer region
544: region of seal material in adjacent region which can be irradiated by UV light
545: region of seal material in middle region which can be irradiated by UV light
546: region of seal material in outer region which can be irradiated by UV light
H1: wiring structure when metal wiring intersects seal material
H2: wiring structure when metal wiring and seal material are disposed in parallel H3: wiring structure when metal wiring superposes seal material plane
R1: adjacent region of seal material
R2: middle region of seal material
R3: outer region of seal material
L1: width of metal wiring in adjacent region
S1: space between adjacent metal wirings in adjacent region
L2: width of metal wiring in middle region
S2: space between adjacent metal wirings in middle region
L3: width of metal wiring in outer region
S3: space between adjacent metal wirings in outer region

DETAILED DESCRIPTION OF THE INVENTION

The embodiments of the invention will be described with reference to the drawings as follows.

Figure 5:
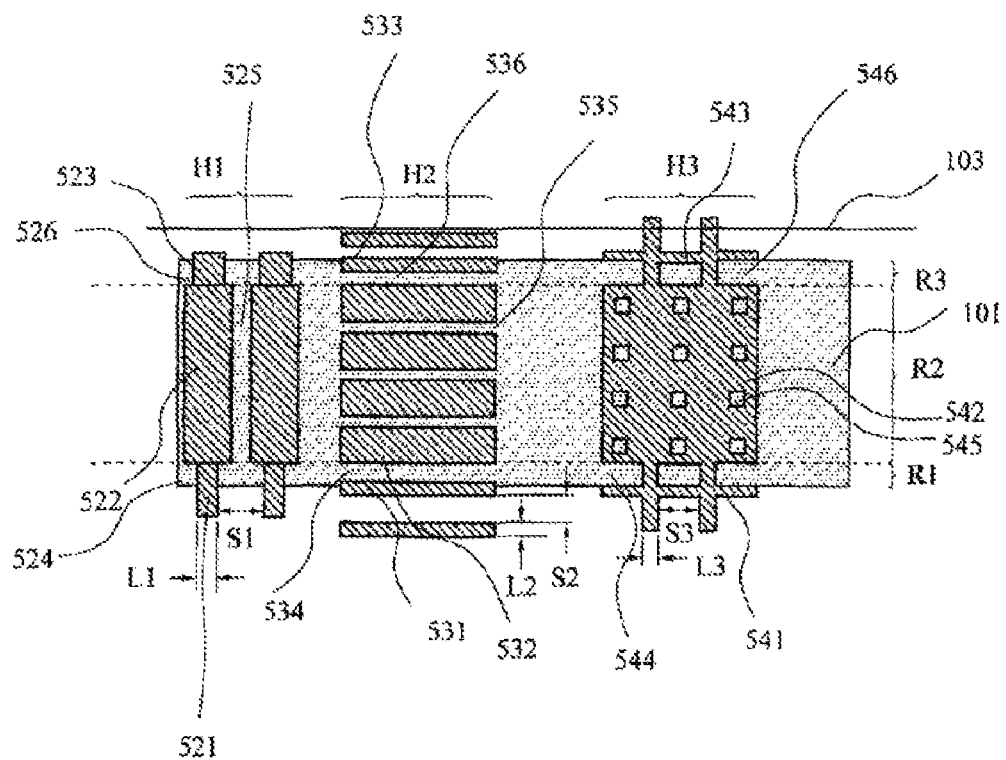
FIG. 5 is a plan view describing conceptually the wiring structure of a liquid crystal panel according to an embodiment of the invention.
Figure 6:
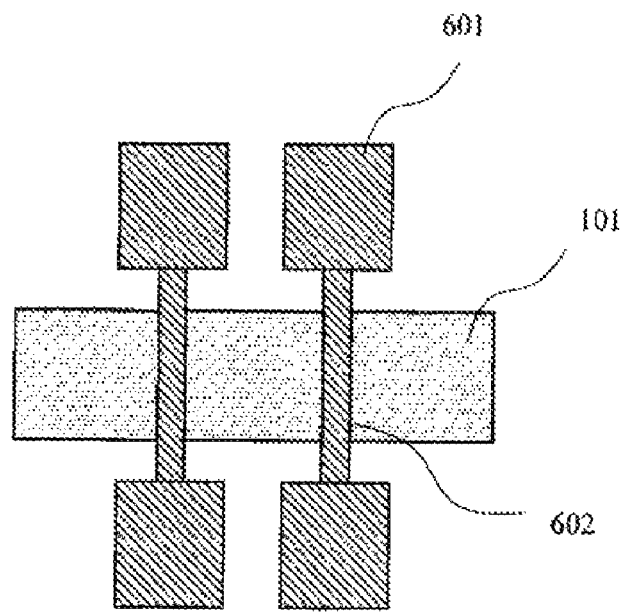
FIG. 6 is a schematic view indicating a wiring structure in which the width of the wiring is narrowed at the superposing portion under a condition that the metal wiring traverses the seal material.
Figure 7:
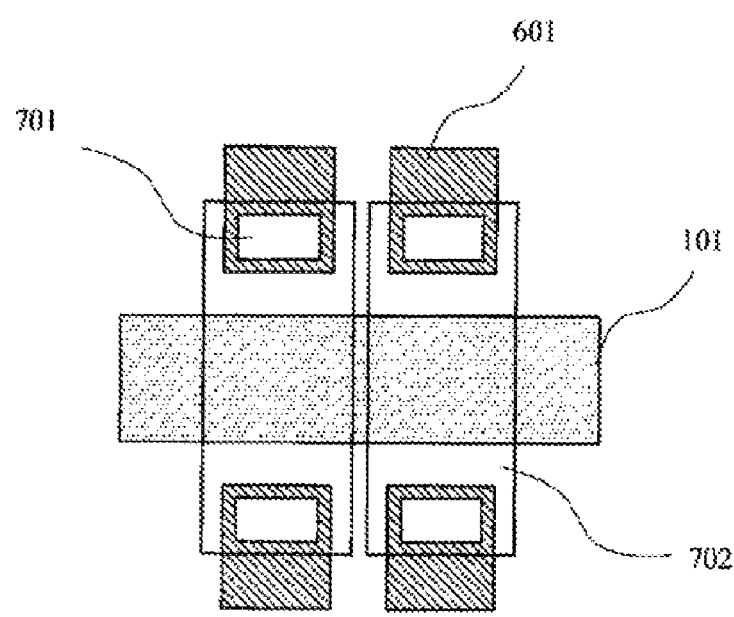
FIG. 7 is a schematic view illustrating a wiring structure in which the wiring of the superposition portion is formed by transparent electrode and the UV light is irradiated to the seal material via the transparent electrode portion under a condition that the metal wiring traverses the seal material.
Figure 8:
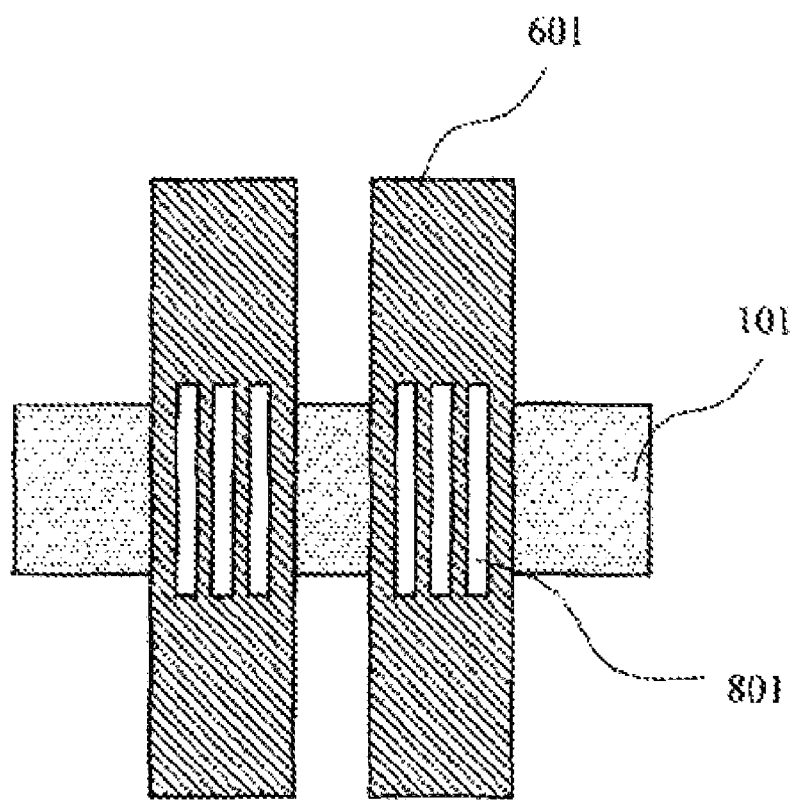
FIG. 8 is a schematic view illustrating a wiring structure in which a slot is formed on the metal wiring of the superposition portion to allow the UV light to irradiate to the seal material via the slot under a condition that the metal wiring traverses the seal material.

FIG. 5 is a plan view describing conceptually the wiring structure of a liquid crystal panel according to an embodiment of the invention. In FIG. 5, 101 is a seal material, 103 is a cut-off line of the substrate, R1 is an adjacent region of the seal material, R2 is a middle region of the seal material, R3 is an outer region of the seal material, H1 is a wiring structure when the metal wiring and the seal material are intersected, H2 is a wiring structure when the metal wiring and the seal material are disposed in parallel, H3 is a wiring structure when the metal wiring and the seal material are superposed, 521 is metal wiring in the adjacent region under the condition of the wiring structure of H1, 522 is metal wiring in the middle region under the condition of the wiring structure of H1, 523 is metal wiring in the outer region under the condition of the wiring structure of H1, 524 is a region of the seal material in the adjacent region which can be irradiated by the UV light under the condition of the wiring structure of H1, 525 is a region of the seal material in the middle region which can be irradiated by the UV light under the condition of the wiring structure of H1, 526 is a region of the seal material in the outer region which can be irradiated by the UV light under the condition of the wiring structure of H1, 531 is metal wiring in the adjacent region under the condition of the wiring structure of H2, 532 is metal wiring in the middle region under the condition of the wiring structure of H2, 533 is metal wiring in the outer region under the condition of the wiring structure of H2, 534 is a region of the seal material in the adjacent region which can be irradiated by the UV light under the condition of the wiring structure of H2, 535 is a region of the seal material in the middle region which can be irradiated by the UV light under the condition of the wiring structure of H2, 536 is a region of the seal material in the outer region which can be irradiated by the UV light under the condition of the wiring structure of H2, 541 is metal wiring in the adjacent region under the condition of the wiring structure of H3, 542 is metal wiring in the middle region under the condition of the wiring structure of H3, 543 is metal wiring in the outer region under the condition of the wiring structure of H3, 544 is a region of the seal material in the adjacent region which can be irradiated by the UV light under the condition of the wiring structure of H3, 545 is a region of the seal material in the middle region which can be irradiated by the UV light under the condition of the wiring structure of H3, and 546 is a region of the seal material in the outer region which can be irradiated by the UV light under the condition of the wiring structure of H3.

Firstly, a condition like the wiring structure of H1 in which the metal wiring and the seal material are intersected will be described. Under such condition, the wiring width of the metal wiring 521 in the adjacent region is decreased. As a result, the region 524 where the seal material in the adjacent region having the wiring's width decreased can be irradiated by the UV light becomes wider, the seal material is irradiated sufficiently by the UV light, and the seal material is cured sufficiently so that the pollution substances are prevented from mixing to the adjacent liquid crystal. When the wiring width of the metal wiring 522 in the middle region is increased, as a result, the wiring resistance of the metal wiring is decreased. In contrast, the region 525 where the seal material in the middle region can be irradiated by the UV light is decreased. However, it is no problem even though the seal material in the middle region cannot be cured sufficiently by the UV light, because it can be adhered sufficiently to the glass substrates during the heat-curing afterwards.

The wiring width of the metal wiring 523 in the outer region is narrower under the condition of the wiring structure of H1. As a result, it is ensured that in the region 526 where the seal material in the outer region can be irradiated by the UV light, the seal material is irradiated sufficiently by the UV light, and the seal material is cured sufficiently so that the uncured seal material is prevented from splashing to the cut-off line 103.

As an example of the specific values of the width of the metal wiring under the condition of the wiring structure of H1, for example, the width L1 of the metal wiring in the adjacent region is about 40 microns, the space S1 between the adjacent metal wirings in the adjacent region is about 40 microns; the width of the metal wiring in the middle region is about 100 microns, the space between the adjacent metal wirings in the middle region is about 50 microns; the width of the metal wiring in the outer region is about 50 microns, and the space between the adjacent metal wirings in the outer region is about 25 microns.

Furthermore, the width of the adjacent region of the seal material is 30~100 microns, the width of the outer region of the seal material is 30~100 microns. The width of the adjacent region of the seal material and the width of the outer region of the seal material are the same under the condition of the wiring structure of H2 and H3 as described below.

Further, the above values are only shown as the examples, the outline of the embodiment is shown in FIG. 5, the specific dimensions of the wiring width, and the like, described above are not exactly the same as the width of the metal wiring and the space between the adjacent metal wiring described in H1 portion of FIG. 5, and so are the conditions in H2 and H3 below.

A condition in which the metal wiring and the seal material are disposed in parallel under the condition of the wiring structure of H2 will be described as follows. Under this condition, for the metal wiring 531 in the adjacent region, the wiring width thereof is decreased. As a result, the region 534, which can be irradiated by the UV light, of the seal material in the adjacent region is increased, the seal material is irradiated sufficiently by the UV light, the seal material is cured sufficiently, and the pollution substances are prevented from mixing into the adjacent liquid crystal. When the wiring width of the metal wiring 532 in the middle region is increased, as a result, the wiring resistance of the metal wiring can be decreased. In contrast, the region 535, which can be irradiated by the UV light, of the seal material in the middle region is decreased, however, it is no problem even though the seal material in the middle region cannot be cured sufficiently by the UV light, because it can be adhered tightly to the glass substrates in virtue of the heat-curing afterwards.

Under the condition of the wiring structure of H2, the wiring width of the metal wiring 533 in the outer region is narrower. As a result, it is ensured that in the region 536 where the seal material in the outer region can be irradiated by the UV light, the seal material is irradiated sufficiently by the UV light, the seal material is cured sufficiently, and the uncured seal material is prevented from splashing to the cut-off line 103.

As an example of the specific values of the width of the metal wiring, and the like, under the condition of the wiring structure of H2, for example, the width L2 of the metal wiring in the adjacent region is about 20 microns, the space S2 between the adjacent metal wiring in the adjacent region is about 20 microns; the width of the metal wiring in the middle region is about 100 microns, the space between the adjacent metal wiring in the middle region is about 50 microns; the width of the metal wiring in the outer region is about 50 microns, and the space between the adjacent metal wiring in the outer region is about 25 microns.

Finally, for the wiring structure of H3, a condition in which the metal wiring and the seal material are superposed in a plane shape will be described. Under this condition, the wiring width of the metal wiring 541 in the adjacent region is decreased. As a result, the region 544, which can be irradiated by the UV light, of the seal material in the adjacent region is increased, the seal material is irradiated sufficiently by the UV light, the seal material is cured sufficiently, and the pollution substances are prevented from mixing into the adjacent liquid crystal. When the surface wiring is used as the metal wiring 542 in the middle region, the opening is disposed in said surface wiring region. Herein, the opening can be of a plurality of shapes, such as a grid shape, a triangle shape, a circular shape, and the like. By means of the disposed opening, the wiring resistance of the metal wiring can be decreased. In contrast, the region 545 of the seal material in the middle region that can be irradiated by the UV light only becomes the opening, however, it is no problem even though the seal material in the middle region cannot be cured sufficiently by the UV light, because it can be adhered tightly to the glass substrates in virtue of the heat-curing afterwards.

For the wiring structure of H3, the wiring width of the metal wiring 543 in the outer region is narrower. As a result, it is ensured that in a region 526 where the seal material in the outer region can be irradiated by the UV light, the seal material is irradiated sufficiently by the UV light, and the seal material is cured sufficiently so that the uncured seal material is prevented from splashing to the cut-off line 103.

As an example of the specific values of the width of the metal wiring for the wiring structure H3, for example, the width L3 of the metal wiring in the adjacent region is about 15 microns, the space S3 between the adjacent metal wiring in the adjacent region is about 20 microns; the width of the metal wiring in the outer region is about 40 microns, and the space between the adjacent metal wiring in the outer region is about 40 microns.

Three kinds of typical wiring methods have been described in the above description. However, the main point of the invention is to divide the seal material region into three regions, such as an adjacent region, a middle region and an outer region, the function of the respective regions must be held to construct a wiring structure that can decrease the wiring resistance of the metal wiring to a maximum extent while the respective function can be satisfied, therefore, the invention is not limited by the wiring structure under the conditions of H1, H2, and H3 described above.

Further, because the detail contents of the seal material, metal wiring, TFT substrate, and CF substrate are well known, so the description thereof is omitted.

What is claimed is:

1. A liquid crystal panel, comprising: a TFT substrate having the pixels containing the thin film transistors disposed thereon in a matrix form; a CF substrate having the color filters disposed thereon; and a liquid crystal sandwiched between said TFT substrate and said CF substrate, said TFT substrate and said CF substrate are adhered by the seal material therebetween, wherein:

the metal wiring disposed on said TFT substrate partially superposes said seal material, said seal material has a region, that is, hereinafter referred to as an adjacent region, which is adjacent to a region for disposing said pixels, that is, hereinafter referred to as a pixel region; a region at the utmost outer side, that is, hereinafter referred to as an outer region; and a region between them, that is, hereinafter referred to as a middle region, for the metal wiring in a portion where the metal wiring corresponds the adjacent region of said seal material, the width of the wiring is decreased, for the metal wiring in a portion where the metal wiring corresponds the middle region of said seal material, the width of the wiring is increased, for the metal wiring in a portion where the metal wiring corresponds the outer region of said seal material, the width of the wiring is decreased.

2. The liquid crystal panel as claimed in claim 1, wherein said metal wiring is disposed to intersect the adjacent region of said seal material, said metal wiring is disposed to intersect the middle region of said seal material;

and said metal wiring is disposed to intersect the outer region of said seal material.

3. The liquid crystal panel as claimed in claim 2, wherein the width of said metal wiring in said adjacent region is about 40 microns, the space between the adjacent metal wirings in said adjacent region is about 40 microns, the width of said metal wiring in said middle region is about 100 microns, the space between the adjacent metal wirings in said middle region is about 50 microns, the width of said metal wiring in said outer region is about 50 microns, and the space between the adjacent metal wirings in said outer region is about 25 microns.

4. The liquid crystal panel as claimed in claim 1, wherein said metal wiring is disposed to superpose and be parallel with the adjacent region of said seal material;

said metal wiring is disposed to superpose and be parallel with the middle region of said seal material; and said metal wiring is disposed to superpose and be parallel with the outer region of said seal material.

5. The liquid crystal panel as claimed in claim 4, wherein:

the width of said metal wiring in said adjacent region is about 20 microns, the space between the adjacent metal wiring in said adjacent region is about 20 microns, the width of said metal wiring in said middle region is about 100 microns, the space between the adjacent metal wiring in said middle region is about 50 microns, the width of said metal wiring in said outer region is about 50 microns, the space between the adjacent metal wiring in said outer region is about 25 microns.

6. The liquid crystal panel as claimed in claim 1, wherein
said metal wiring is disposed to intersect the adjacent region of said seal material;
said metal wiring is disposed to superpose the middle region, and said superposing-disposed metal wiring portion is disposed to be surface wiring with an opening;
and said metal wiring is disposed to intersect the outer region of said seal material.

7. The liquid crystal panel as claimed in claim 1, wherein:
the width of said adjacent region is 30~100 microns,
the width of said outer region is 30~100 microns.

8. The liquid crystal panel as claimed in claim 1, wherein:
said adjacent region is a region in said seal material beginning from the boundary of said pixel region and extending at a direction to said outer region for about 100 microns,
the wiring width of said metal wiring in said adjacent region is adjusted to allow the solidification, which is obtained by curing said seal material in said adjacent region by using the UV light curing, to reach above 60%.

9. The liquid crystal panel as claimed in claim 1, wherein:
said outer region is a region in said seal material beginning from the outer boundary and extending at a direction to said adjacent region for about 100 microns,
in said outer region, the wiring width of said metal wiring in said outer region is adjusted to allow the solidification, which is obtained by curing said seal material in said outer region by using the UV light curing, to be above 10%, so that the expansion of the uncured seal material during the heat-curing will not exceed the cut-off line used for cutting off the liquid crystal panel from the mother glass.

\* \* \* \* \*